(12) United States Patent
Imajo et al.

(10) Patent No.: US 8,804,066 B2
(45) Date of Patent: Aug. 12, 2014

(54) BACKLIGHT UNIT AND LIQUID CRYSTAL DISPLAY DEVICE HAVING THE SAME

(75) Inventors: Ikuko Imajo, Chiba (JP); Sachiko Yamazaki, Chiba (JP); Kikuo Ono, Chiba (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 224 days.

(21) Appl. No.: 13/275,882

(22) Filed: Oct. 18, 2011

(65) Prior Publication Data

US 2012/0092592 A1    Apr. 19, 2012

(30) Foreign Application Priority Data

Oct. 19, 2010   (JP) .................................. 2010-234806

(51) Int. Cl.
*G02F 1/01*      (2006.01)
*G02B 6/00*      (2006.01)
*H05B 43/00*     (2006.01)
*H01S 3/00*      (2006.01)

(52) U.S. Cl.
USPC .................... 349/61; 349/62; 349/63; 349/64

(58) Field of Classification Search
CPC .............. G02G 1/01; G02G 1/133603; G02G 1/133611
USPC ............................................... 349/65, 61–64
See application file for complete search history.

(56) References Cited

U.S. PATENT DOCUMENTS

| | | | |
|---|---|---|---|
| 7,300,177 B2* | 11/2007 | Conner | 362/244 |
| 7,427,146 B2* | 9/2008 | Conner | 362/268 |
| 7,719,016 B2* | 5/2010 | Nada et al. | 257/95 |
| 7,955,879 B2* | 6/2011 | Kim | 438/29 |
| 2006/0072315 A1* | 4/2006 | Han et al. | 362/231 |
| 2006/0152931 A1* | 7/2006 | Holman | 362/297 |
| 2006/0195293 A1* | 8/2006 | Koike et al. | 702/159 |
| 2006/0221592 A1* | 10/2006 | Nada et al. | 362/29 |
| 2007/0019394 A1* | 1/2007 | Park et al. | 362/29 |
| 2007/0247833 A1* | 10/2007 | Lee et al. | 362/97 |
| 2007/0279352 A1* | 12/2007 | Tanaka | 345/87 |
| 2008/0158875 A1* | 7/2008 | Kim et al. | 362/231 |
| 2008/0170415 A1* | 7/2008 | Han et al. | 362/612 |
| 2009/0059621 A1* | 3/2009 | Takahashi et al. | 362/619 |
| 2009/0147537 A1* | 6/2009 | Iwasaki | 362/620 |
| 2009/0278151 A1* | 11/2009 | Kim | 257/98 |

(Continued)

FOREIGN PATENT DOCUMENTS

| | | | | |
|---|---|---|---|---|
| EP | 1710603 A1 | * | 10/2006 | |
| JP | 02077726 A | * | 3/1990 | ............ G02F 1/1335 |
| JP | 2009-087879 | | 4/2009 | |
| JP | 2009158274 A | * | 7/2009 | |

*Primary Examiner* — Kaveh Kianni
(74) *Attorney, Agent, or Firm* — Hamre, Schumann, Mueller & Larson, P.C.

(57) ABSTRACT

A backlight unit has a light source area. The width of the light source area in a first direction is shorter than the width of a liquid crystal panel in the first direction. A plurality of LED modules (31) are arranged along the second direction perpendicular to the first direction. End lenses (41A, 41B) and a middle lens (42) for enlarging a light divergence angle are disposed on the plurality of LED modules (31). The direction in which the end lens (41A, 41B) enlarges the light divergence angle differs from that in which the middle lens (42) enlarges the divergence angle. This structure can reduce difference in brightness of the liquid crystal panel, while reducing the number of light sources.

12 Claims, 14 Drawing Sheets

(56) References Cited

U.S. PATENT DOCUMENTS

| | | |
|---|---|---|
| 2009/0316072 A1* | 12/2009 | Okumura et al. ............... 349/64 |
| 2010/0002169 A1* | 1/2010 | Kuramitsu et al. ............. 349/65 |
| 2010/0079980 A1* | 4/2010 | Sakai ........................... 362/97.1 |
| 2011/0026242 A1* | 2/2011 | Ryu et al. ..................... 362/97.1 |
| 2011/0210367 A1* | 9/2011 | Kim ................................ 257/98 |
| 2012/0087126 A1* | 4/2012 | Takeuchi et al. .......... 362/249.01 |
| 2012/0105764 A1* | 5/2012 | Yokota ............................ 349/61 |
| 2012/0120343 A1* | 5/2012 | Yamamoto ...................... 349/61 |
| 2012/0126261 A1* | 5/2012 | Shimizu .......................... 257/88 |
| 2012/0154713 A1* | 6/2012 | Kwon ............................. 349/64 |
| 2012/0287352 A1* | 11/2012 | Takata ......................... 348/739 |
| 2012/0327311 A1* | 12/2012 | Kuromizu .................... 348/739 |
| 2013/0010494 A1* | 1/2013 | Arai ............................. 362/608 |
| 2013/0214674 A1* | 8/2013 | Inoguchi ...................... 313/498 |

* cited by examiner

BACKLIGHT UNIT AND LIQUID CRYSTAL DISPLAY DEVICE HAVING THE SAME

CROSS-REFERENCE TO RELATED APPLICATION

The present application claims priority from Japanese application JP2010-234806 filed on Oct. 19, 2010, the content of which is hereby incorporated by reference into this application.

BACKGROUND OF THE INVENTION

Field of the Invention

The present invention relates to a backlight unit for a liquid crystal display device, and in particular, to a technique for reducing unevenness in brightness on the display.

Some conventional direct-type backlight units used in liquid crystal display devices employ a plurality of LEDs (Light Emitting Diode) as a light source (e.g., JP Laid-open Publication No. 2009-87879). The plurality of LEDs are arranged in matrix over the entire area of the backlight unit.

SUMMARY OF THE INVENTION

A structure having LEDs arranged in matrix over the entire area of the backlight unit is not preferable in view of costs because many LEDs are required.

Regarding this point, a following structure has been studied. Specifically, an elongate circuit board is placed on the rear side of the liquid crystal panel, the circuit board is provided with a plurality of LEDs arranged thereon in the longitudinal direction of the circuit board, and lenses disposed on LEDs expand light from the LEDs toward a larger area on the liquid crystal panel. For example, an elongate circuit board is arranged in the middle area in the up-down direction on the backlight unit and has a plurality of LEDs arranged in one or two lines in the left-right direction, and the divergence angles of light from the LEDs are widen by lenses in the up-down direction.

A structure employing the above described elongate circuit board may cause difference in brightness between left and right end areas on the liquid crystal panel (that is, areas toward the ends in the length direction of the circuit board) and other areas. For example, when the length of the circuit board is shorter than the width of the liquid crystal panel, such a difference in brightness is apt to be caused. Such difference can be hardly eliminated when all lenses disposed on the LEDs having identical light distribution characteristic, that is, all lenses enlarge divergence angles of light in the same direction.

The present invention has been conceived in view of the above, and an object thereof is to provide a backlight unit and a liquid crystal display device capable of reducing difference in brightness on a liquid crystal panel, while reducing the number of light sources.

In order to achieve the above described objects, according to one aspect of the present invention, there is provided a backlight unit comprising a light source area facing the rear surface of a rectangular liquid crystal panel and having a shorter width in a first than a width of the liquid crystal panel in the first direction, the first direction being defined as one direction of a lateral direction and a longitudinal direction of the liquid crystal panel. Further, the backlight unit comprises a plurality of light sources located in the light source area and aligned along a second direction defined as the other direction of the lateral direction and the longitudinal direction. Further, the backlight unit comprises an end lens disposed on a light source located toward on an end of the light source area and being for enlarging the divergence angle of the light from the light source; and a middle lens disposed on a light source located closer to the middle of the light source area than the light source with the end lens disposed thereon and being for enlarging the divergence angle of the light from the light source. The direction in which the end lens enlarges the divergence angle differs from the direction in which the middle lens enlarges the divergence angle.

In order to achieve the above described object, according to another aspect of the present invention, there is provided a liquid crystal display device having the above described backlight unit.

According to the present invention, it is possible to reduce the number of light sources, compared to the conventional backlight unit described above. Further, according to the present invention, a direction in which the end lens enlarges the divergence angle differs from that in which the middle lens enlarges the divergence angle, and this arrangement makes it easier to eliminate difference in brightness between an end area of the liquid crystal panel in the second direction and other areas.

In one embodiment of the present invention, the direction in which the middle lens enlarges the divergence angle may be biased to the first direction of the light source area. This makes it easier to ensure sufficient brightness in the middle area of the liquid crystal panel and an end area of the liquid crystal panel in the first direction of the light source area.

In one embodiment of the present invention, the direction in which the end lens enlarges the divergence angle may be biased to a direction which is diagonal to the first direction of the light source area and directed toward outside in the second direction. This makes it easier to ensure sufficient brightness in an end area of the liquid crystal panel in the second direction and at a corner of the liquid crystal panel.

In this embodiment, the direction in which the end lens enlarges the divergence angle may be biased to a direction directed to a corner of the liquid crystal panel. This makes it easier to improve brightness at the corner of the liquid crystal panel.

In this embodiment, the end lens and the middle lens may have an identical shape, and be different in orientation in the light source area. This arrangement allows reduction of the kinds of components in use. Further, the end lens and the middle lens each may have a first surface, a second surface, and a third surface, wherein the first surface is a convex curved surface swelling toward the liquid crystal panel, and the second surface and the third surface respectively suspend from edges of the first surface, are perpendicular to the light source area and face toward opposite sides to each other.

In one embodiment of the present invention, the backlight unit may further comprise a first end lens and a second end lens each serving as the end lens. The direction in which the first end lens enlarges the divergence angle and the direction in which the second end lens enlarges the divergence angle may be respectively inclined toward opposite sides to each other from the second direction. This makes it easier to ensure sufficient brightness in a larger end area of the liquid crystal panel.

In one embodiment of the present invention, the middle lens may have a shape that enlarges the divergence angle in a direction biased toward the first direction, and the end lens may have a shape capable of enlarging the divergence angle equally in all radius directions around a light source on which the end lens disposed. This makes it easier to ensure sufficient brightness in the end area of the liquid crystal panel in the first direction. The middle lens may have a first surface, a second surface, and a third surface, wherein the first surface is a convex curved surface swelling toward the liquid crystal panel, and the second surface and the third surface respectively suspend from edges of the first surface, are perpendicular to the light source area and face toward opposite sides to each other.

In one embodiment of the present invention, a plurality of light sources may be aligned at least in two lines, and a plurality of light sources constituting at least one of the two lines and the plurality of light sources constituting another line may be positioned alternately in the second direction. This may allow selection of a larger lens for the end lens and the middle lens.

In one embodiment of the present invention, the end lens and the middle lens may be integrally formed. This can reduce the number of components to use and manufacturing steps.

DETAILED DESCRIPTION OF THE INVENTION

Figure 1:
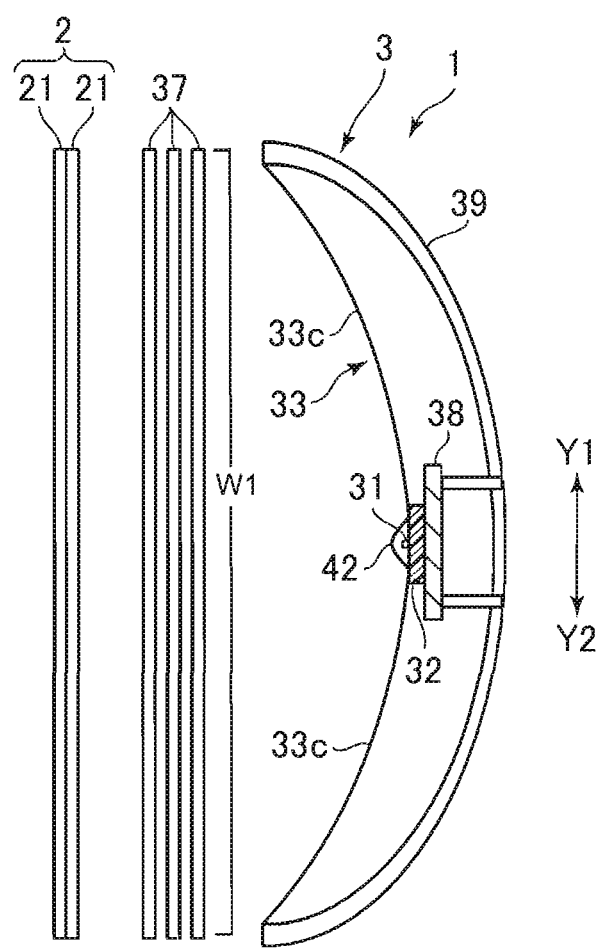
FIG. 1 is a cross sectional view showing a schematic structure of a liquid crystal display device having a backlight unit according to a first embodiment of the present invention.
Figure 2:
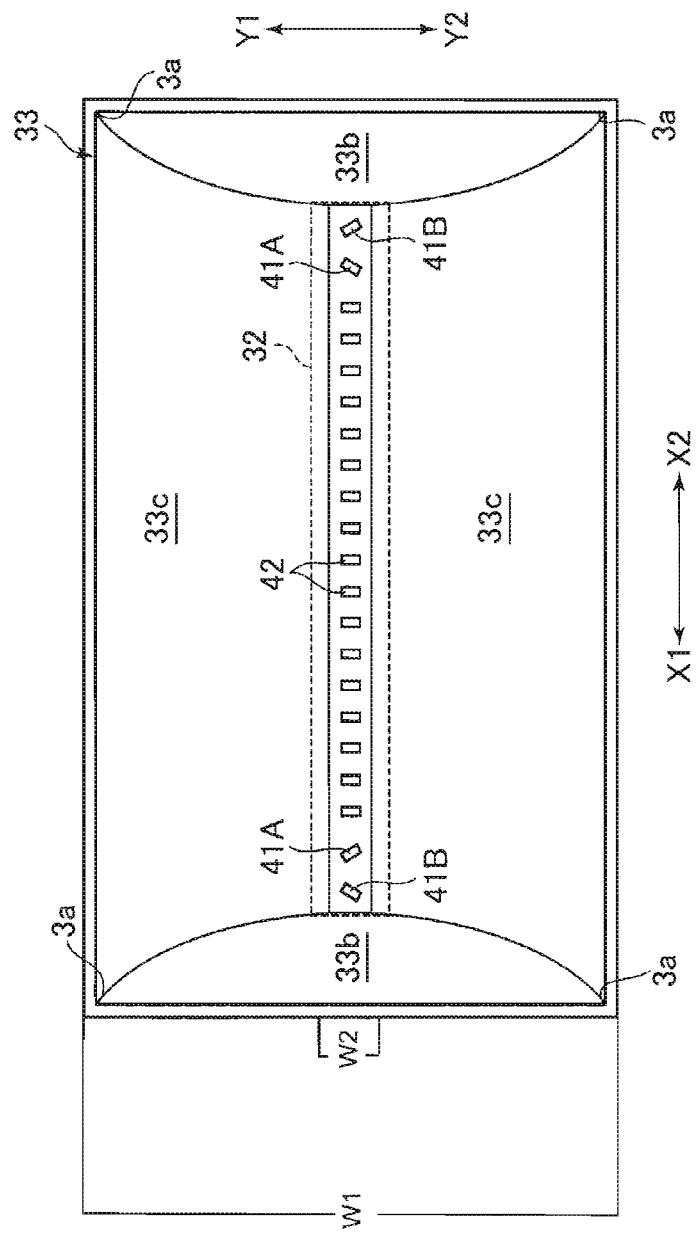
FIG. 2 is a plan view of a substrate on which a reflection sheet and an LED module of the backlight unit shown in FIG. 1 are mounted.
Figure 3:
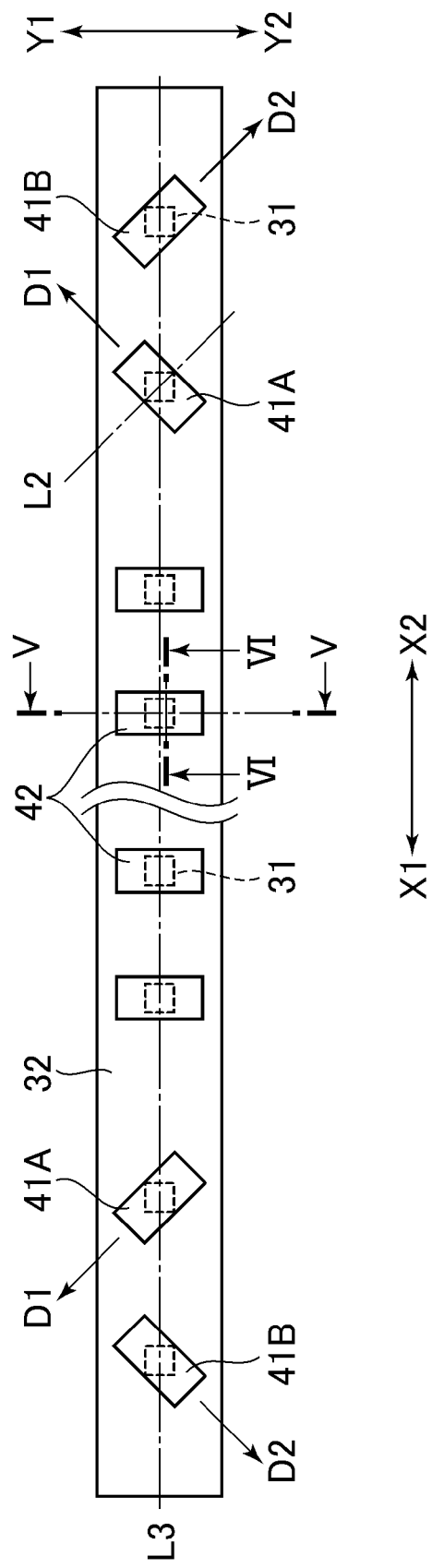
FIG. 3 is a plan view of the above described substrate.

In the following, one embodiment of the present invention will be described referring the accompanying drawings. FIG. 1 is across sectional view showing a schematic structure of a liquid crystal display device 1 having a backlight unit 3 according to a first embodiment of the present invention. FIG. 2 is a plan view of a reflection sheet 33 and a substrate 32 of the backlight unit 3. FIG. 3 is a plan view of the substrate 32.

As shown in FIG. 1, the liquid crystal display device 1 includes a liquid crystal panel 2. The liquid crystal panel 2 has a rectangular shape of which left-right width is larger than the up-down width (width of Y1-Y2 direction shown in FIG. 1). The liquid crystal panel 2 includes a pair of light transmissive substrates (specifically, a glass substrate) 21. One of the substrates has a TFT (Thin Film Transistor) formed thereon and the other has a color filter formed thereon. Liquid crystal is sealed between the two substrates 21. Polarizing filters (not shown) are respectively attached on the display surface and the rear surface which is an opposite surface from the display surface.

As shown in FIG. 1, the liquid crystal display device 1 includes a backlight unit 3 arranged on the rear side of the liquid crystal panel 2 and irradiating light toward the rear surface of the liquid crystal panel 2. The backlight unit 3 has a rectangular shape of which dimension is in conformity with the liquid crystal panel 2. Specifically, similar to the liquid crystal panel 2, the left-right width (width of the X1-X2 direction shown in FIG. 2) of the backlight unit 3 is wider than the up-down width thereof.

As shown in FIGS. 1 and 3, the backlight unit 3 includes a plurality of LED modules (light source) 31 for irradiating light toward the rear surface of the liquid crystal panel 2. Each LED module 31 includes an LED chip (light emitting element), a reflector for reflecting light from the LED chip, light transmissive sealing resin for sealing the LED chip, and so forth.

As shown in FIGS. 1 and 2, the backlight unit 3 includes a substrate 32 (which defines light source area) where a plurality of LED modules 31 are mounted. The substrate 32 is a circuit board made of insulating material, such as glass epoxy, paper phenol, paper epoxy, and so forth. The backlight unit 3 is a direct-type backlight unit, and thus the substrate 32 faces the rear surface of the liquid crystal panel 2.

As shown in FIG. 2 or 3, the substrate 32 is an elongate board, and formed like a band in this example. Accordingly, the width of the substrate 32 in a direction perpendicular to the length direction thereof is shorter than the width of the liquid crystal panel 2 and the width of the backlight unit 3 in the direction perpendicular to the length direction (the length direction (the second direction in claims) of the substrate 32 is indicated with the X1-X2 direction in the figures, and the perpendicular direction (the first direction in claims) is indicated with the Y1-Y2 direction, hereinafter referred to as width direction of the substrate 32). In this example, the width W2 of the substrate 32 in the width direction of the substrate 32 is shorter than a half of the width W1 of the liquid crystal panel 2 and the backlight unit 3 in the width direction.

As shown in FIG. 2, the substrate 32 is arranged such that the length direction thereof is along an edge of the liquid crystal panel 2. Specifically, the substrate 32 is long in the left-right direction, and the length direction of the substrate 32 is along the upper and lower edges of the liquid crystal panel 2.

The length of the substrate 32 is slightly shorter than the left-right width of the liquid crystal panel 2 and that of the backlight unit 3. The substrate 32 having such a shape may be a single circuit board or composed of a plurality of circuit boards aligned in the left-right direction.

As shown in FIG. 3, a plurality of LED modules 31 are mounted on the substrate 32, being aligned along the length direction of the substrate 32. That is, the light source area where a plurality of LED modules 31 are arranged is an elongate area that is long in the left-right direction. In this example, a plurality of LED modules 31 are mounted in one line in the left-right direction. The substrate 32 is arranged in the substantial middle area in the up-down direction of the backlight unit 3. In other words, the light source area is provided only in the middle area in the up-down direction of the backlight unit 3, and therefore no light source area provided in other areas (upper, lower, right, and left side areas of the substrate 32). Accordingly, the liquid crystal panel 2 includes, in the middle area thereof in the up-down direction, an area directly (straightly) facing the substrate 32, specifically, the LED modules 31 (the area facing the substrate 32 is hereinafter referred to as a facing area). Further, the liquid crystal panel 2 includes, in upper and lower areas thereof, areas without any LED module 31 facing the areas (hereinafter referred to as a non-facing area). The substrate 32 is elongated, and thus the upper and lower non-facing areas are larger in the up-down width than the facing area.

As shown in FIG. 1, the backlight unit 3 includes an enclosure 39 that defines the rear surface of the backlight unit 3. The enclosure 39 in this example is curved such that the middle part thereof in the up-down direction swells rearward. The substrate 32 is supported by the enclosure 39. Specifically, the substrate 32 is fixed on a mount panel 38, which is fixed on the inside of the enclosure 39.

As shown in FIG. 1 or 3, the backlight unit 3 further includes a reflection sheet 33. The reflection sheet 33 has a rectangular shape having a dimension in conformity with the liquid crystal panel 2 in a plan view. In this example, the reflection sheet 33 is curved or bent such that the middle part thereof swells rearward. The reflection sheet 33 as well is accommodated in the enclosure 39.

A plurality of LED modules 31 are arranged on the front side of the reflection sheet 33 (the front surface serves as a reflection surface). Light from the plurality of LED modules 31 are partially reflected on the front surface of the reflection sheet 33 toward the rear surface of the liquid crystal panel 2. The plurality of LED modules 31 are arranged at the middle in the up-down direction of the reflection sheet 33. That is, the LED module 31 is positioned at the deepest part of the reflection sheet 33. The reflection sheet 33 includes a slope surface 33c expanding upward or downward from the light source area, while being inclined forward (see FIG. 1).

The length of the substrate 32 is shorter than the left-right width of the reflection sheet 33. The reflection sheet 33 includes, on the left and right side parts thereof, slope surfaces 33b extending rightward or leftward from the substrate 32 while being inclined forward.

As shown in FIG. 1, the substrate 32 is positioned on the rear surface of the reflection sheet 33. The reflection sheet 33 is placed on the surface of the substrate 32, avoiding the plurality of LED modules 31. Specifically, a plurality of holes are formed on the reflection sheet 33 so that each LED module 31 is positioned in each hole.

The backlight unit 3 includes a plurality of optical sheets 37 between the liquid crystal panel 2, and the reflection sheet 33 and the LED module 31. The optical sheet 37 is a diffusing sheet, a prism sheet, or the like.

Figure 4:
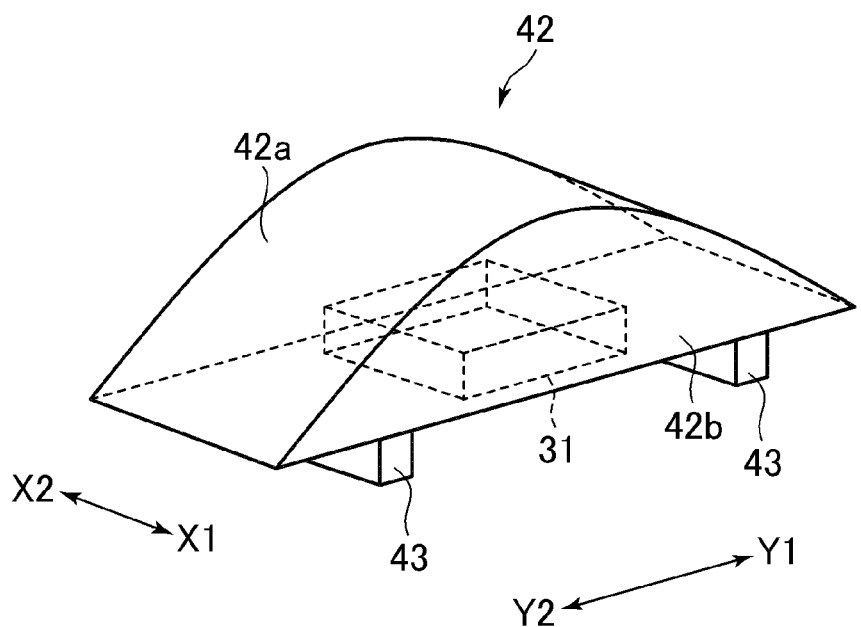
FIG. 4 is a perspective view of a middle lens mounted on the LED module.
Figure 5:
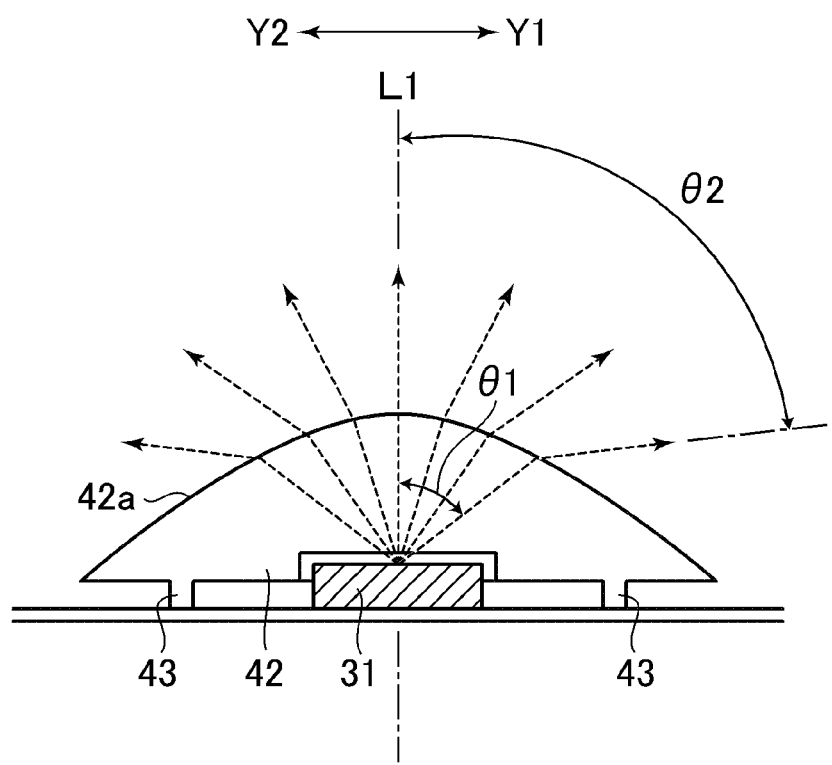
FIG. 5 is a cross sectional view along the line V-V shown in FIG. 3.
Figure 6:
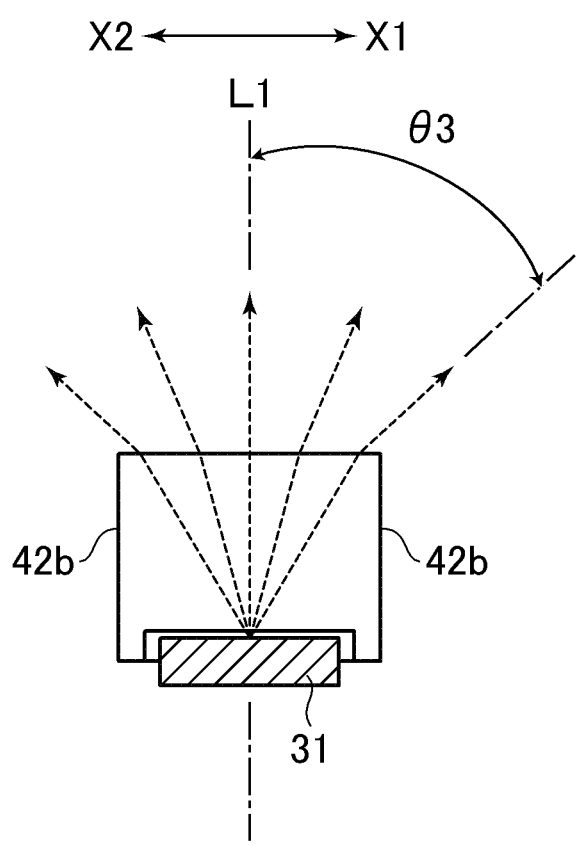
FIG. 6 is a cross sectional view along the line VI-VI shown in FIG. 3.

As shown in FIGS. 2 and 3, the backlight unit 3 includes end lenses 41A, 41B and middle lenses 42, which are separately formed from the LED module 31. FIG. 4 is a perspective view of the middle lens 42. FIG. 5 is a cross sectional view along the line V-V shown in FIG. 3, while FIG. 6 is a cross sectional view along the Line VI-VI shown in FIG. 3.

The end lenses 41A, 41B are disposed on the LED modules 31 located toward each of the both end of the elongate substrate 32. In the example shown in FIG. 3, the end lenses 41A, 41B are disposed on a plurality of LED modules 31 located on each of the right and left ends of the substrate 32. In this example, the end lenses 41A, 41B are respectively disposed on two LED modules 31 on each end.

As shown in FIG. 3, the middle lenses 42 are disposed on the LED modules 31 arranged closer to the middle of the substrate 32 than the LED modules 31 with the end lenses 41A, 41B are. In this example, the middle lenses 42 are disposed on all of the LED modules 31 arranged between the LED modules 31 with the end lenses 41A, 41B on one end and those on the other end. One middle lens 42 is disposed on each of the plurality of LED modules 31.

The end lenses 41A, 41B and the middle lens 42 are each larger in dimension than the LED module 31 in a plan view, and therefore, placed over the LED module 31. Light from the LED module 31 passes through the lens 41A, 41B, 42 to be emitted toward the rear surface of the liquid crystal panel 2. The divergence angle (the range of an emitting angle, e.g., θ1 in FIG. 5) of the light from the LED module 31 is enlarged by the lens 41A, 41B, 42. Note that the divergence angle is an angle indicating an extent of spread of the light from each LED module 31, and is, e.g., an angle relative to the optical axis of the LED module 31 (the straight line L1 in FIGS. 5 and 6, that is, a straight line passing through the middle of the LED module 31 and being perpendicular to the substrate 32).

The end lens 41A, 41B and the middle lens 42 differ in shape and/or orientation (posture) on the substrate 32 from each other, and accordingly have different light distribution characteristic. That is, the direction in which the end lens 41A, 41B enlarges the divergence angle differs from the direction in which the middle lens 42 enlarges the divergence angle.

As shown in FIGS. 5 and 6, the direction in which the middle lens 42 enlarges the divergence angle is biased to the width direction of the substrate 32 (the up-down direction in this example). In other words, the middle lens 42 enlarges the light divergence angle intensively in the width direction of the substrate 32. That is, the middle lens 42 expands the light intensively in the width direction of the substrate 32. Consequently, the divergence angle enlarged by the middle lens 42 in the width direction of the substrate 32 is larger than that in the length direction (the left-right direction in this example). Specifically, referring to FIGS. 5 and 6, the divergence angle (θ2 in FIG. 5) defined in a plane including the optical line L1 of the LED module 31 and being parallel to the width direction of the substrate 32 is larger than the divergence angle (θ3 in FIG. 6) defined in a plane including the optical line L1 of the LED module 31 and being parallel to the length direction of the substrate 32. In this example, the divergence angle θ2 enlarged in the width direction of the substrate 32 is larger the divergence angle that in any other radial directions around the LED module 31. Therefore, the light directed upward or downward through the middle lens 42 is reflected on the slope surface 33c of the reflection sheet 33 to be irradiated toward the upper and lower parts on the liquid crystal panel 2 which have no LED module 31 facing thereto.

As shown in FIG. 4, the light emission surface (top surface) 42a of the middle lens 42 swells toward the liquid crystal panel 2. Therefore, the light emission surface 42a includes a slope extending from the top thereof toward upper side (in the Y1 direction) while getting gradually closer to the substrate 32, and another slope extending from the top toward lower side (in the Y2 direction) while getting gradually closer to the substrate 32. The light emission surface 42a is a curved surface which a straight line parallel to the left-right direction can form when the line shifting parallel. The middle lens 42 has a substantially rectangular shape that is long in the left-right direction in a plan view. The middle lens 42 has a pair of lateral surfaces 42b that respectively suspend from the left and right edges of the light emission surface 42a toward the substrate 32. In this example, the lateral surface 42b is formed perpendicular to the substrate 32, as well as to the length direction of the substrate 32. Accordingly, enlargement of the light divergence angle in the length direction of the substrate 32 is reduced by lateral surface 42b. Note that the shape of the middle lens 42 is not limited to the described above, and the middle lens 42 may be formed having, e.g., an oval shape that is long in the up-down direction.

The direction in which the end lens 41A, 41B enlarges the light divergence angle is biased toward outside in the length direction of the substrate 32 (the directions D1, D2 in FIG. 3 indicate the direction in which the end lens 41A, 41B enlarges the light divergence angle, hereinafter referred to as an end divergence direction). That is, the end lens 41A, 41B enlarges the light divergence angle intensively in the end divergence direction D1, D2. That is, the end lens 41A, 41B expand the light intensively in the end divergence direction D1, D2. The end divergence direction D1, D2 is diagonal to both of the length and width directions of the substrate 32. As described above, the middle lens 42 enlarges the divergence angle intensively in the width direction of the substrate 32. Therefore, the light divergence angle enlarged by the end lens 41A, 41B in the end divergence direction D1, D2 is larger than that enlarged by the middle lens 42 in the end divergence direction D1, D2.

In this example, the end divergence direction D1, D2 is directed from the LED module 31 with the end lens 41A, 41B placed thereon toward the corner of the liquid crystal panel 2 and the corner 3a of the backlight unit 3 (see FIG. 2). The light emitted from the end lens 41A, 41B is directed to the corner of the liquid crystal panel 2 either directly or after reflection on the slope surface 33b of the reflection sheet 33.

As described above, the end lenses 41A, 41B are disposed on each end of the substrate 32. As shown in FIG. 3, the end divergence direction D1 of the end lens 41A and the end divergence direction D2 of the end lens 41B are substantially symmetric to each other relative to the straight line L3 along the length direction of the substrate 32. That is, the end divergence direction D1 and the end divergence direction D2 are respectively inclined toward opposite sides to each other from the length direction of the substrate 32 by a substantially identical angle. The end divergence directions D1, D2 are directed to two corners 3a of the backlight unit 3 that are positioned on the opposite sides to each other across the straight line L3.

The end lens 41A, 41B has a shape identical to that of the middle lens 42 shown in FIGS. 5 and 6, but is different in orientation (posture) on the substrate 32 from the middle lens 42. That is, as shown in FIG. 3, the end lens 41A, 41B has an elongate substantially rectangular shape in a plan view, similar to the middle lens 42. However, while the length direction of the middle lens 42 is along the direction along the up-down direction, the length direction of the end lens 41A, 41B is along the end divergence direction D1, D2. In other words, the end lens 41A, 41B is arranged such that the length direction thereof corresponds to a direction directed to the corner 3a of the backlight unit 3, and therefore the lateral surface of the end lens 41A, 41B is oriented in parallel to the end divergence direction D1, D2. This arrangement can restrict the light having passed through the end lens 41A, 41B from expanding in a direction perpendicular to the end divergence direction D1, D2.

Incidentally, the end lens 41A, 41B in this example has a symmetric shape relative to the straight line L2 in a direction perpendicular to the end divergence direction D1, D2, as shown in FIG. 3. This shape allows enlargement of the light divergence angle in a direction opposite from the end divergence direction D1, D2, as well as the end divergence direction D1, D2.

The above described shape and placement enables the end lens 41A, 41B to enlarge the light divergence angle intensively in the end divergence direction D1, D2. According to the end lens 41A, 41B, the light divergence angle enlarged in the end divergence direction D1, D2 is larger than that in any other radial directions around the LED module 31.

Note that the shape of the end lens 41A, 41B is not limited to the described above. For example, the end lens 41A, 41B may be formed having an oval shape that is long in the end divergence direction D1, D2.

Further, although the end lens 41A, 41B has a symmetric shape relative to the straight line L2 along a direction perpendicular to the end divergence direction D1, D2 in this example, the end lens 41A, 41B may have an asymmetrical shape relative to the straight line L2 so that the divergence angle enlarged toward the corner 3a becomes larger than the divergence angle enlarged in the direction opposite from the corner 3a.

For mounting end lenses 41A, 41B and middle lens 42 on the LED modules 31, various methods are available. For example, as shown in FIG. 4 or 5, a plurality of projections 43 may be formed on the lower surface of the lens 41A, 41B, 42, and these projections 43 may be attached on the front surface of the substrate 32. Alternatively, a concave portion may be formed on the lower surface (the surface facing the substrate 32) of the lens 41A, 41B, 42, and the LED module 31 is accommodated in the concave. Further, the surface around the concave may be attached on the substrate 32 through adhesive agent or the like. Still alternatively, the lower surface of the lens 41A, 41B, 42 may be fixedly attached on the top surface of the LED module 31 through adhesive agent or the like.

As described above, the middle lens 42 has an elongate rectangular shape that is long in the width direction (that is, the up-down direction) of the substrate 32 in a plan view. This arrangement allows a smaller interval between the plurality of LED modules 31 with the middle lenses 42 placed thereon than interval between the plurality of LED modules 31 with the end lenses 41A, 41B placed thereon, as shown in FIG. 3. However, the manner of placement of the LED module 31 is not limited to the above described, and all LED modules 31 may be placed with an identical interval.

As described above, the backlight unit 3 includes an elongate light source area, that is, the substrate 32, facing the rear surface of the liquid crystal panel 2. The width of the substrate 32 in the direction perpendicular to the length direction thereof is shorter than the width of the liquid crystal panel 2 in the perpendicular direction. The plurality of LED modules 3 placed on the substrate 32 are arranged in the length direction of the substrate 32. The end lenses 41A, 41B are placed on the LED modules 31 located toward the end of the plurality of LED modules 31. The middle lens 42 is placed on the LED modules 31 closer to the middle than the LED modules 31 with the end lenses 41A, 41B placed thereon. This arrangement can reduce the number of LED modules required, compared to a conventional backlight unit where a plurality of LED modules are arranged in matrix. Further, the direction in which the end lens 41A, 41B enlarges the divergence angle differs from the direction in which the middle lens 42 enlarges the divergence angle. This structure makes it easier to eliminate the difference in brightness between an end area on the liquid crystal panel 2 in the length direction of the substrate 32 and other areas. Further, the above described middle lens 42 enlarges the light divergence angle intensively in the width direction of the substrate 32, and this structure makes it easier to ensure sufficient brightness in upper and lower end areas on the liquid crystal panel 2. Further, the end lens 41A, 41B enlarges the light divergence angle intensively in a direction diagonal to the width direction of the substrate 32 toward outside in the length direction of the substrate (that is, the end divergence direction D1 or D2), and this structure makes it easier to ensure sufficient brightness in left and right end areas on the liquid crystal panel 2.

In the backlight unit 3, the end divergence direction D1, D2 corresponds to a direction directed from the end lens 41A, 41B to the corner 3a of the backlight unit 3. This arrangement makes it further easier to improve the brightness at the corner of the liquid crystal panel 2.

Figure 7:
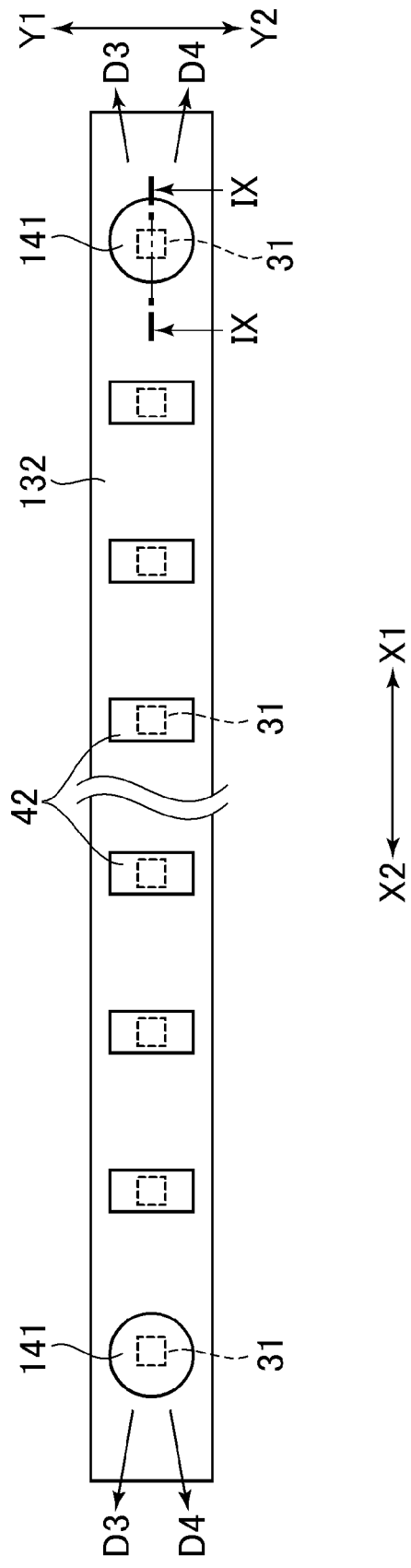
FIG. 7 is a plan view of a substrate of a backlight unit according to a second embodiment of the present invention.
Figure 8:
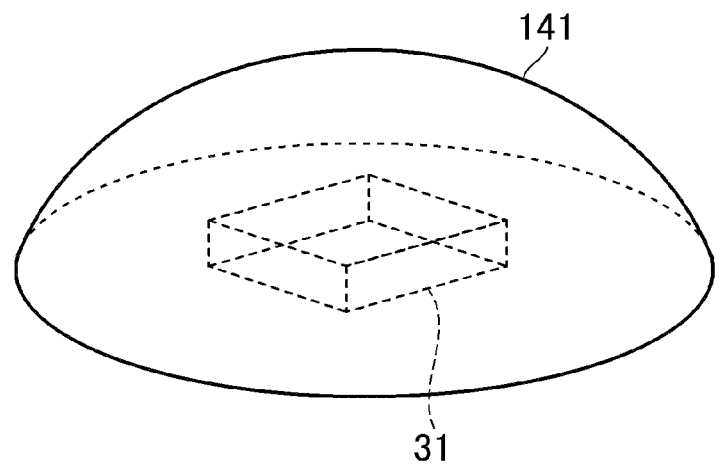
FIG. 8 is a perspective view of an end lens mounted on the substrate shown in FIG. 7.
Figure 9:
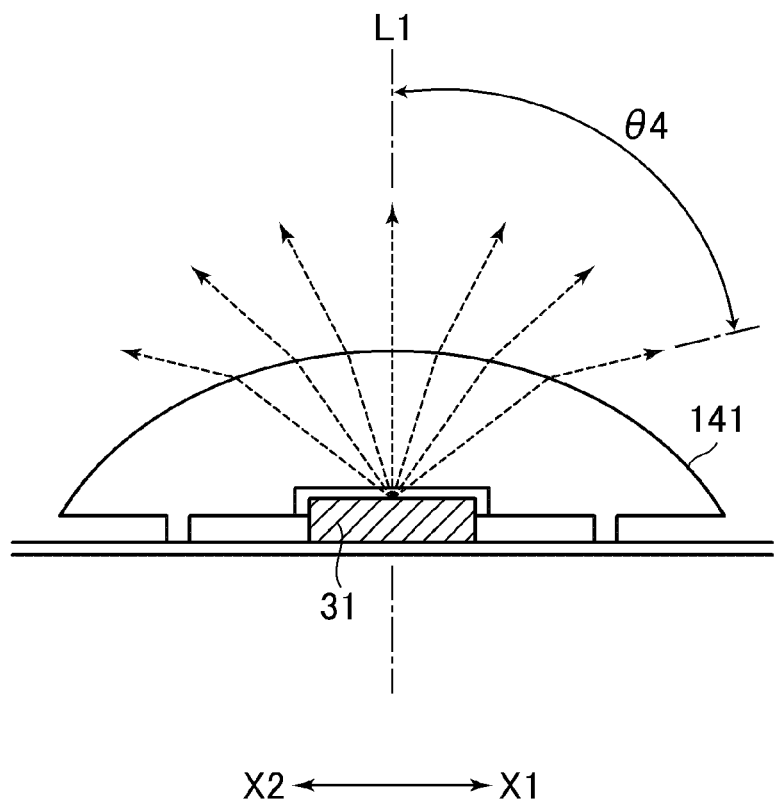
FIG. 9 is a cross sectional view along the line IX-IX shown in FIG. 7.

FIG. 7 is a plan view of the substrate 132 of a backlight unit according to a second embodiment of the present invention. FIG. 8 is a perspective view of an end lens 141 provided to the substrate 132. FIG. 9 is a cross sectional view along the line IX-IX shown in FIG. 7. In these diagrams, a member identical to that described above is given an identical reference numeral, with the description thereof omitted. Note that the position and shape of the substrate 132 are identical to those of the substrate 32 described above.

As shown in FIG. 7, a plurality of LED modules 31 are aligned on the substrate 132 in one line along the length direction of the substrate 132. The end lens 141 is disposed on the LED module 31 positioned on each of the both ends of the substrate 132. The middle lens 42 is disposed on the LED module 31 positioned closer to the middle than the LED module 31 with the end lens 141 disposed thereon is.

Differing from the end lenses 41A, 41B, the end lens 141 has a shape that can enlarge the light divergence angle substantially equally in all radius directions around the LED module 31 with the end lens 141 disposed thereon. In the example described here, as shown in FIGS. 7 to 9, the end lens 141 is an isotropic lens, and has a shape rotational symmetric relative to the central line perpendicular to the substrate 132, and is circular in a plan view. On other words, the end lens 141 is a planoconvex lens, having a top surface swelling upward (light emission surface) and a flat lower surface (light incoming surface). Incidentally, the lower surface has a concave formed thereon, and the LED module 31 is arranged in the concave (see FIG. 9).

Due to such a shape of the end lens 141, the light divergence angle (e.g., θ4 in FIG. 9) enlarged by the end lens 141 toward outside in the length direction of the substrate 132 is larger than the divergence angle enlarged by the middle lens 42 toward outside in the length direction of the substrate 132. In other words, the divergence angle enlarged by the end lens 141 in a direction directed from the end lens 141 to the left or right edge of the backlight unit 3 (e.g., D3, D4 directions in FIG. 7) is larger than the divergence angle enlarged by the middle lens 42 in the same direction. In still other words, amount of light going from the end lens 141 toward the left or right edge of the backlight unit 3 is larger than amount of light going from the middle lens 42 in the same direction.

Figure 10:
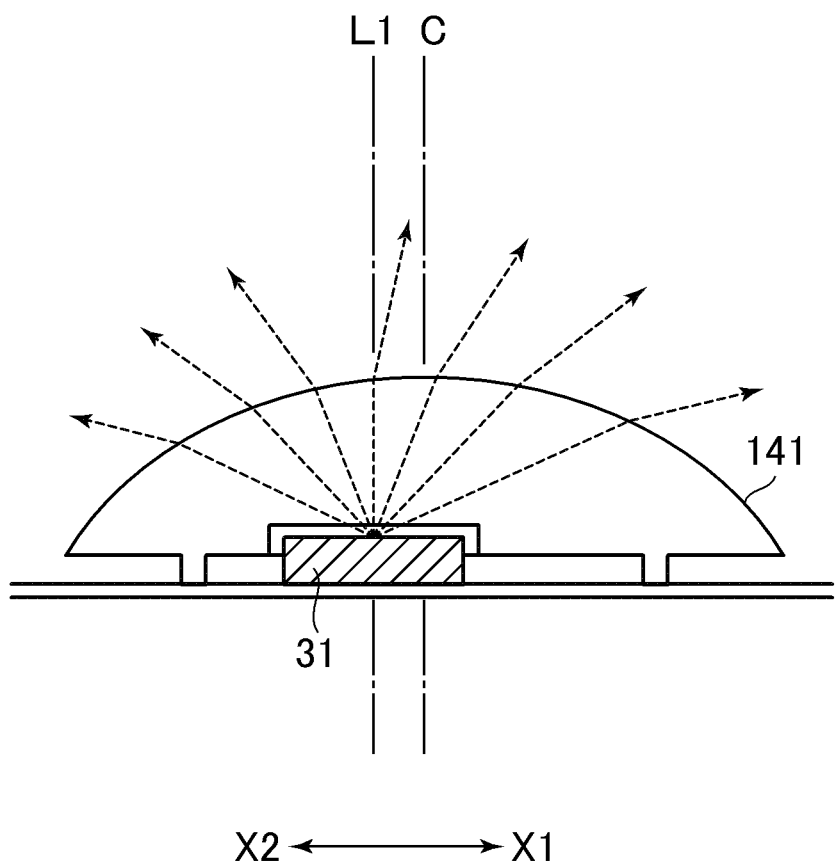
FIG. 10 is a cross sectional view of a modified example of an end lens according to the second embodiment of the present invention.

In this example, as shown in FIG. 9, the end lens 141 is disposed directly on the LED module 31. That is, the optical axis L1 of the LED module 31 is common to the central line of the end lens 141. Therefore, the end lens 141 spreads the light from the LED module 31 equally in all radius directions around the optical axis L1. Alternatively, the end lens 141 may be positioned offset relative to the LED module 31. Specifically, as shown in FIG. 10, the optical axis L1 of the LED module 31 may be positioned closer to the middle in the length direction of the substrate 132 than the center line C of the end lens 141 is. This arrangement enables the end lens 141 to enlarge the light divergence angle intensively toward outside in the length direction of the substrate 132.

Figure 11:
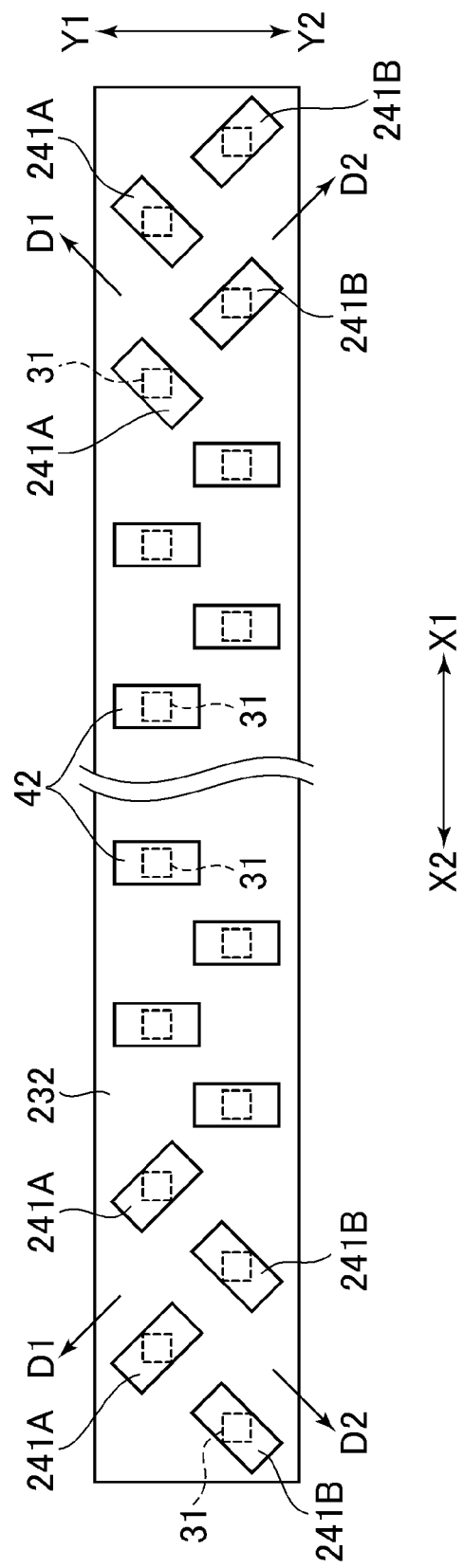
FIG. 11 is a plan view of a substrate of the backlight unit according to a third embodiment of the present invention.

FIG. 11 is a plan view of the substrate 232 of a backlight unit according to a third embodiment of the present. In this diagram as well, a member identical to that described above is given an identical reference numeral, with a description thereof omitted.

The plurality of LED modules 31 on the substrate 232 are aligned in two or more lines along the length direction of the substrate 232. The LED modules 31 constituting one of the two adjacent lines and the LED modules 31 constituting the other line are alternately positioned in the length direction of the substrate 232. In the example shown in FIG. 11, the LED modules 31 are aligned in two lines, and the LED modules 31 constituting one of the lines and the LED modules 31 constituting the other line are alternately placed. The position and shape of the substrate 232 are substantially identical to that of the substrate 32 described above. Note that the width of the substrate 232 may be larger than that of the substrate 32 because of the number of lines of the LED module 31.

The end lenses 241A, 241B are disposed on the LED modules 31 located toward each of the both ends of the substrate 232. The middle lenses 42 are placed on the LED modules 31 between the LED modules 31 arranged one end and having the end lenses 241A, 241B disposed thereon, and the LED modules 31 arranged the other end and having the end lenses 241A, 241B disposed thereon.

End lenses 241A are disposed on a plurality of (two in FIG. 11) LED modules 31 located toward end of one line of the LED modules 31, while end lenses 241B are disposed on a plurality of (two in FIG. 11) LED modules 31 located toward end of the other line of the LED modules 31. The end lenses 241A, 241B have light distribution characteristic similar to those of the end lenses 41A, 41B, respectively. That is, the end lenses 241A, 241B have shapes identical to those of the respective end lenses 41A, 41B, and are in posture relative to the substrate 232 similar to the end lenses 41A, 41B.

Incidentally, in the example shown in FIG. 11, two end lenses 241A and two end lenses 241B are provided on each of the both ends of the substrate 232. However, the number of end lenses 241A, 241B is not limited to this number, and may be desirably changed according to the brightness at the left and right end areas on the liquid crystal panel 2.

Figure 12:
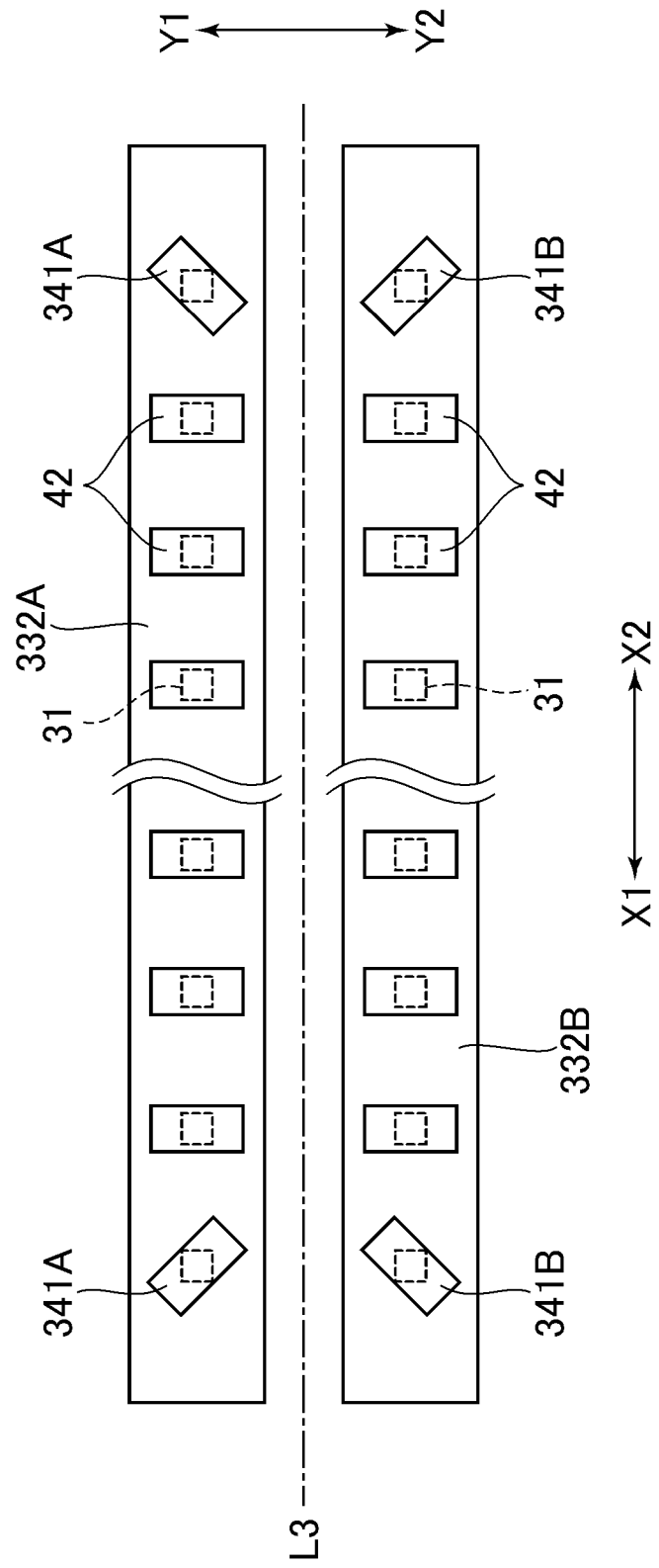
FIG. 12 is a plan view of a substrate of the backlight unit according to a fourth embodiment of the present invention.

FIG. 12 is a plan view of a substrate of a backline unit according to a fourth embodiment of the present invention. In this diagram as well, a member identical to that described above is given an identical reference numeral, with a description thereof omitted.

In this embodiment, a plurality of (two in this example) substrates 332A, 332B are arranged in parallel to each other on the backlight unit. The two substrates 332A, 332B are arranged with an interval in the width direction thereof and located as a whole in the middle area in the up-down direction of the backlight unit. A plurality of LED modules 231 are aligned in one line on each of the substrates 332A, 332B. The end lenses 341A, 341B are respectively disposed on the LED modules 31 on the substrate 332A, 332B. The middle lens 42 is arranged between the end lenses 341A, 341B. Specifically, in this example, the end lens 341A is disposed on the LED module 31 on the upper line, while the end lens 341B is disposed on the LED module 31 on the lower line. The end lenses 341A, 341B respectively have light distribution characteristic identical to those of the end lenses 41A, 41B shown in FIG. 3. The direction in which the end lens 341A intensively enlarges the divergence angle and the direction in which the end lens 341B intensively enlarges the divergence angle are respectively inclined from the straight line L3 along the length direction of the substrate 332A, 332B toward opposite sides to each other.

Figure 13:
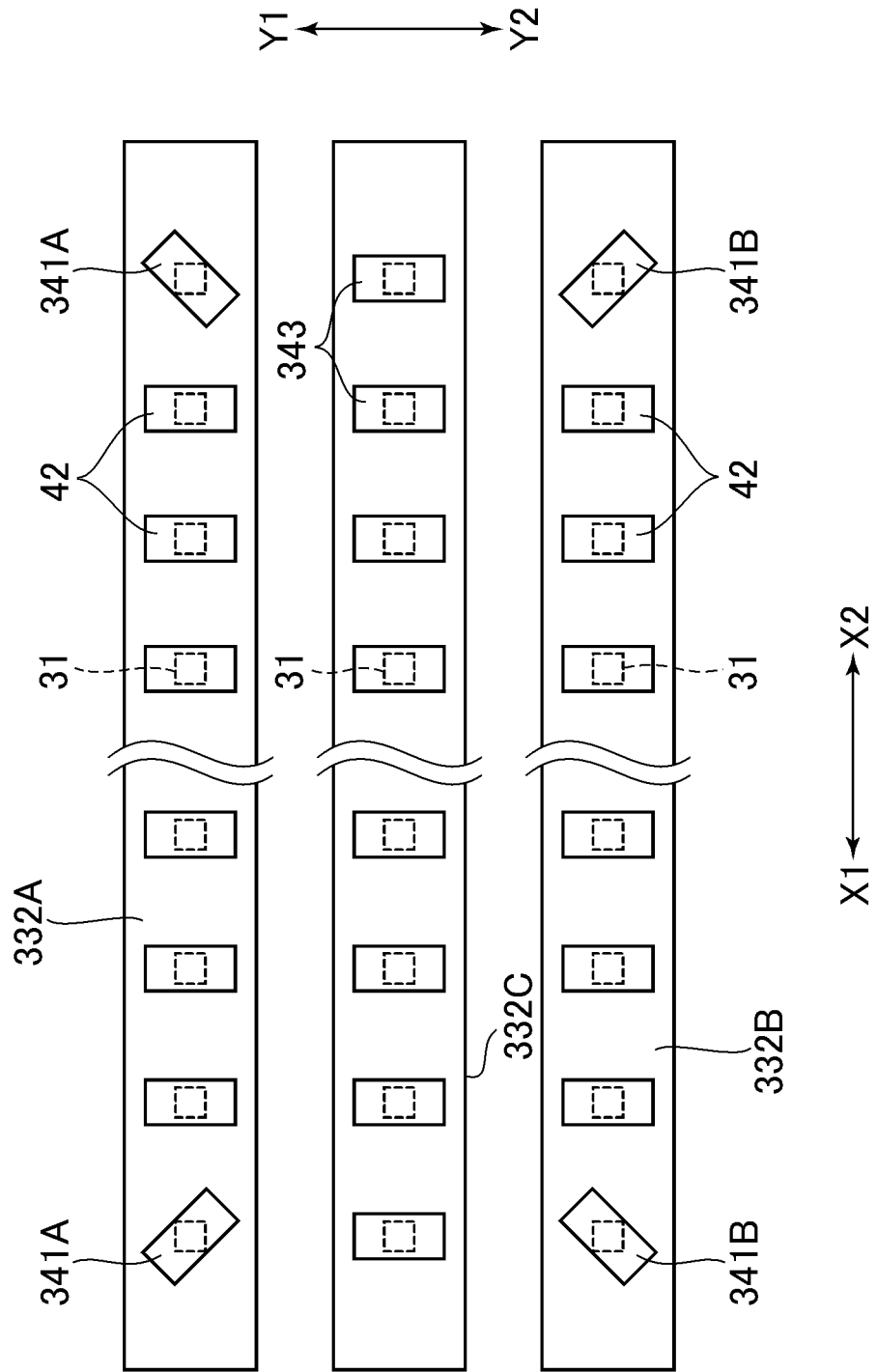
FIG. 13 is a plan view of another example of a substrate of the backlight unit according to the fourth embodiment of the present invention.

FIG. 13 is a modified example of the structure shown in FIG. 12. In the example shown in FIG. 13, a substrate 332C is additionally provided between the substrates 332A and 332B. The three substrates 332A, 332C, 332B are arranged in the width direction thereof (the up-down direction), and positioned as a whole in the middle area in the up-down direction. The plurality of LED modules 31a mounted on the substrate 332C respectively have lenses 343 disposed thereon, which have light distribution characteristic identical to that of the above described middle lenses 42. That is, a lens 343 for enlarging the light divergence angle intensively in the width direction of the substrate 332C is arranged on each end of the substrate 332C. This arrangement makes it further easier to ensure sufficient brightness along the upper and lower edges of the liquid crystal panel.

Figure 14:
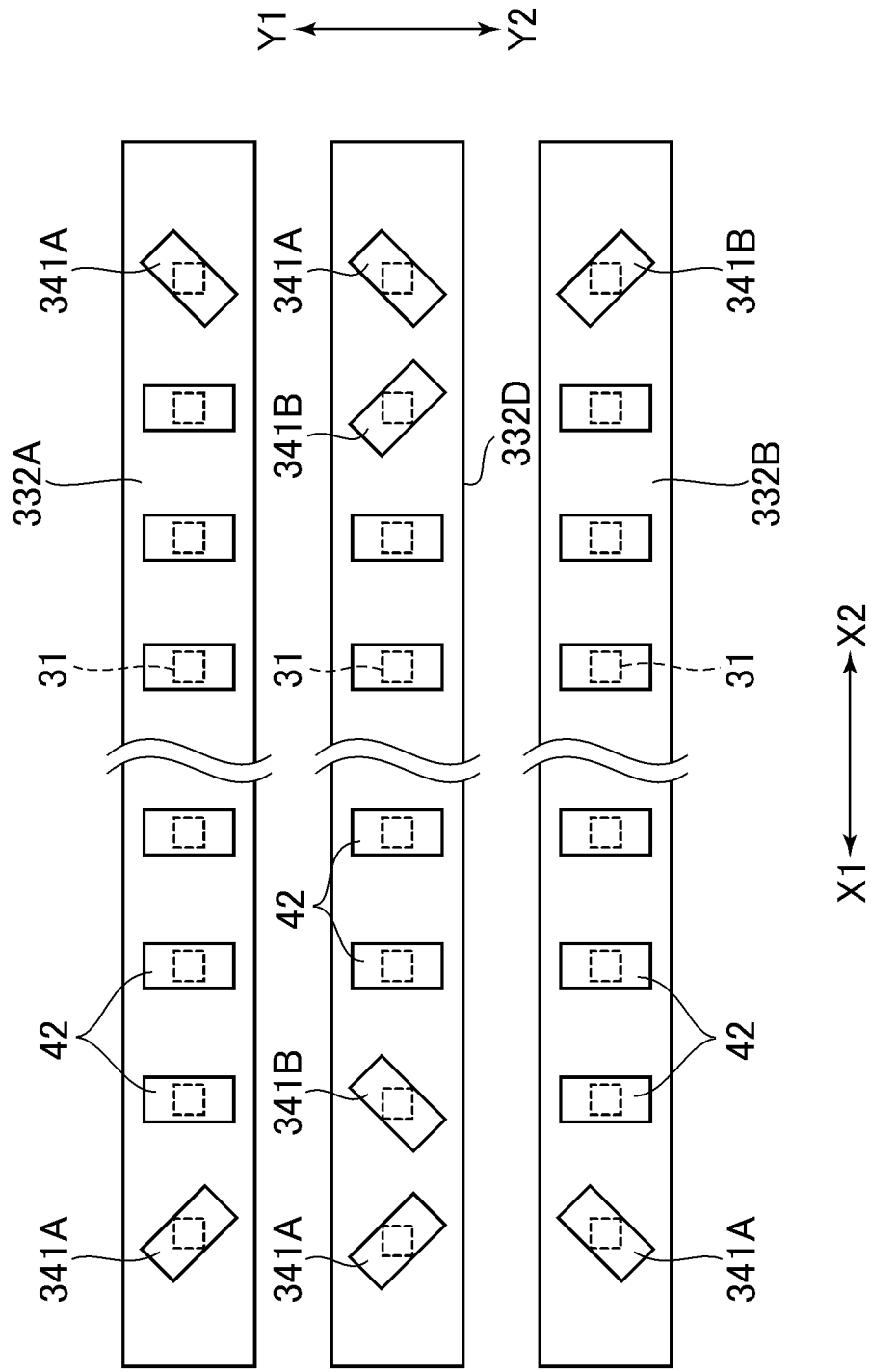
FIG. 14 is a plan view of a still another example of a substrate of the backlight unit according to the fourth embodiment of the present invention.

FIG. 14 is a modified example of the structure shown in FIG. 12. In the example shown in FIG. 14, a substrate 332D is mounted between the substrate 332A and the substrate 332B, instead of the substrate 332C. The three substrates 332A, 332D, 332B are arranged in the width direction thereof. Differing from the substrate 332C, the end lenses 341A, 341B are disposed on the LED modules 31 arranged toward each end of the substrate 332D. The middle lens 42 is placed between the end lenses 341A, 341B on the one end and those lenses 341A, 341B on the other end. This arrangement enables the end lenses 341A provided to the substrates 332A and 332D to direct the light toward the upper corners of the liquid crystal panel 2, and enables the end lenses 341B provided to the substrates 332B and 332D to direct the light toward the lower corners of the liquid crystal panel 2.

Figure 15:
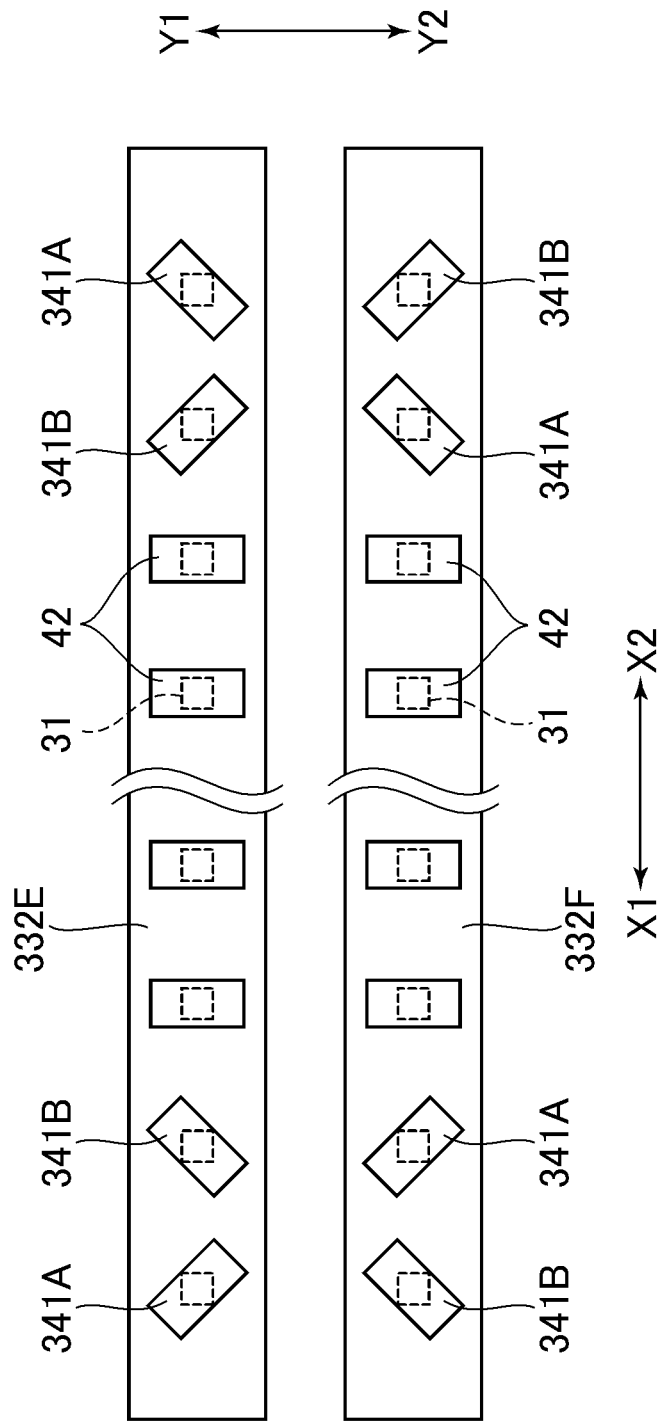
FIG. 15 is a plan view of a yet another example of a substrate of the backlight unit according to the fourth embodiment of the present invention.

FIG. 15 is a diagram showing another modified example of the structure shown in FIG. 12. In the example shown in FIG. 15, two substrates 332E and 332F are mounted in parallel to each other and arranged in the width direction. The LED modules 31 arranged toward each end of the upper substrate 332E have the end lenses 341A and 341B disposed thereon. Similarly, the LED modules 31 arranged toward each end of the lower substrate 332E as well have the end lenses 341A and 341B disposed thereon. This arrangement of the end lenses 341A, 341B makes it further easier to ensure sufficient brightness at the corners of the liquid crystal panel 2.

Figure 16:
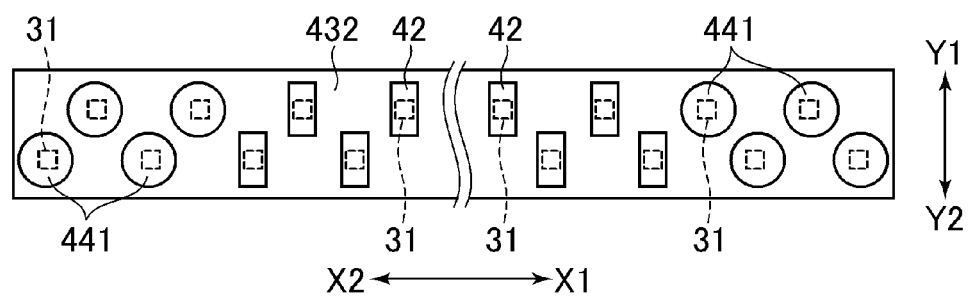
FIG. 16 is a plan view of a substrate of the backlight unit according to a fifth embodiment of the present invention.

FIG. 16 is a plan view of the substrate 432 of a backlight unit according to a fifth embodiment of the present invention. In this diagram as well, a member identical to that in the above is given an identical reference numeral, with a description thereof omitted.

The plurality of LED modules 31 are arranged in two lines on a substrate 432. The plurality of LED modules 31 constituting one line and those of the other line are alternately positioned in the length direction of the substrate 432.

End lenses 441 are disposed on a plurality of LED modules 31 arranged toward each end of the substrate 432, while the middle lens 42 are disposed on the LED modules 31 between the LED module 31 having the end lens 441 and arranged on one end of the substrate 432, and the LED module 31 having the end lens 441 and arranged toward the other end. The end lens 441 has a shape having light distribution characteristic identical to that of the end lens 141 described above. That is, the end lens 441 enlarges the light divergence angle substantially equally in all radius directions around the LED module 31. In this regard, the end lens 441 as well may be positioned offset relative to the LED module 31, similar to the end lens 141 shown in FIG. 10.

In the example shown in FIG. 16, end lenses 441 are disposed on a plurality of (four here) of LED modules 31 arranged toward each end of the substrate 432. Specifically, the same number (two here) of end lens 441 are provided in each line of the LED module 31. However, the number of end lens 441 is not limited to this number, and may be desirably changed according to the brightness at the left and right end areas on the liquid crystal panel 2.

Figure 17:
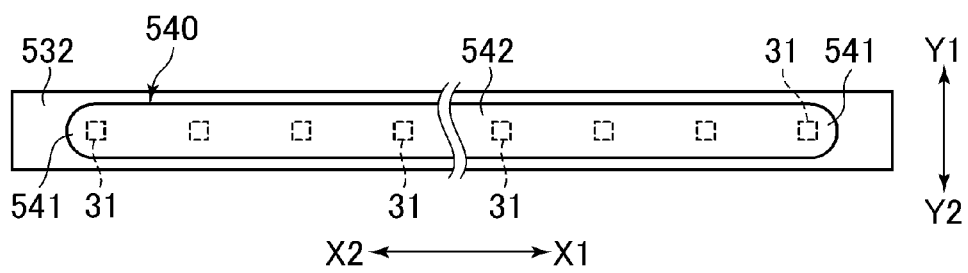
FIG. 17 is a plan view of a substrate of the backlight unit according to a sixth embodiment of the present invention.

FIG. 17 is a plan view of a substrate 532 of a backlight unit according to a sixth of the present invention.

The plurality of LED modules 31 mounted on the substrate 532 are arranged in one line along the length direction of the substrate 532. A lens 540 is placed on the plurality of LED modules 31. The lens 540 is a bar lens that is long in the length direction of the substrate 532, and provided over the plurality of LED modules 31.

The lens 540 includes a middle lens part 542 and an end lens part 541. The end lens part 541 is located in each of the both ends of the lens 540, while the middle lens part 542 constitutes a part between the two end lens parts 541. The middle lens part 542 and the end lens part 541 are integrally formed. That is, the end lens part 541 is continued to the middle lens part 542.

The light distribution characteristic of the middle lens part 542 differs from that of the end lens part 541. That is, similar to the above described middle lens 42, the middle lens part 542 enlarges the light divergence angle in the width direction of the substrate 532 intensively, compared to the length direction of the substrate 532. The middle lens part 542 has a shape obtained by stretching the above described middle lens 42 in the left-right direction, and therefore the top surface (left emission surface) of the middle lens part 542 swells and has a curved surface which a straight line parallel to the left-right direction can form when the line shifting parallel.

The end lens part 541 has a half of a shape that is rotational symmetric relative to a straight line perpendicular to the substrate 532, being hemispheric in a plan view. That is, the end lens part 541 substantially has a half shape of a planoconvex lens having a convex light emission surface. Therefore, the direction in which the end lens part 541 intensively enlarges the divergence angle differs from the direction in which the middle lens part 542 intensively enlarges the divergence angle.

Note that the present invention is not limited to the above described embodiments, and can be modified in various manners.

For example, according to the first to sixth embodiments, the substrate 32 or the like where a plurality of LED modules 31 are mounted has an elongate shape that is long in the left-right direction of the backlight unit 3 and the liquid crystal panel 2. However, the substrate 32 or the like may have an elongate shape that is long in the up-down direction. In this case, the substrate 32 or the like is placed, e.g., in a middle area in the left-right direction on the backlight unit 3.

Further, in the above description, the substrate 32 or the like have a plurality of LED modules 31 mounted thereon, which are aligned in either one or two lines. However, the plurality of LED modules 31 may be aligned in a larger number of lines (e.g., three lines). Alternatively, some of the plurality of LED modules 31 may be aligned in one line, while the remaining LED modules 31 may be aligned in two lines.

Further, one middle lens 42 is disposed on one LED module 31 in the above description. However, one middle lens 42 may be disposed over a plurality of (e.g., two or three) LED modules 31.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A backlight unit, comprising:
a light source section, adapted to face a rear surface of a liquid crystal panel, the liquid display panel having a width in a first direction and a length in a second direction perpendicular to the first direction, the light source section having a width in the first direction and a length in the second direction perpendicular to the first direction, the width of the light source section being smaller than the width of the liquid crystal panel, the light source section comprising:
a substrate; and
a plurality of light sources arranged on the substrate along the length of the light source section;
a plurality of lenses for enlarging a divergence angle of light emitted from the light sources toward a liquid crystal panel, the plurality of lenses comprising:
at least one end lens for at least one individual first light source located toward an end of the light source section and being for enlarging a divergence angle of light from the first light source; and
at least one middle lens for at least one individual second light source located closer to a middle of the light source section than the first light source and being for enlarging a divergence angle of light from the second light source, wherein
a direction in which the at least one end lens enlarges the divergence angle differs from a direction in which the at least one middle lens enlarges the divergence angle.

2. The backlight unit according to claim 1, wherein the direction in which the middle lens enlarges the divergence angle is biased to the first direction of the light source section.

3. The backlight unit according to claim 2, wherein the direction in which the end lens enlarges the divergence angle is biased to a direction which is diagonal to the first direction of the light source area and directed toward outside in the second direction of the light source section.

4. The backlight unit according to claim 3, wherein the direction in which the end lens enlarges the divergence angle is biased to a direction directed to a corner of the liquid crystal panel.

5. The backlight unit according to claim 3, wherein the end lens and the middle lens have an identical shape and are different in orientation in the light source section.

6. The backlight unit according to claim 5, wherein the end lens and the middle lens each have a first surface, a second surface, and a third surface, the first surface including a curved surface swelling toward the liquid crystal panel, and the second surface and the third surface each suspending from an edge of the first surface, being perpendicular to the light source section and facing toward opposite sides to each other.

7. The backlight unit according to claim 3, further comprising
a first end lens and a second end lens each serving as the end lenses,
wherein
a direction in which the first end lens enlarges the divergence angle and a direction in which the second end lens enlarges the divergence angle are respectively inclined toward opposite sides to each other from the second direction of the light source section.

8. The backlight unit according to claim 1, wherein
the middle lens has a shape for enlarging the divergence angle biasedly in the first direction of the light source section, and
the end lens has a shape capable of enlarging the divergence angle equally in all radius directions around a light source on which the end lens disposed.

9. The backlight unit according to claim 8, wherein the middle lens has a first surface, a second surface, and a third surface, the first surface including a curved surface swelling toward the liquid crystal panel, and the second surface and the third surface each suspending from an edge of the first surface, being perpendicular to the light source section and facing toward opposite sides to each other.

10. The backlight unit according to claim 3, wherein
the plurality of light sources are aligned at least in two lines, and
a plurality of light sources constituting at least one of the two lines and a plurality of light sources constituting another line are positioned alternately in the second direction of the light source section.

11. The backlight unit according to claim 1, wherein the end lens and the middle lens are integrally formed.

12. A liquid crystal display device comprising the backlight unit according to claim 1.

* * * * *